(12) United States Patent
Spaether

(10) Patent No.: US 6,831,032 B2
(45) Date of Patent: Dec. 14, 2004

(54) ZIEGLER-NATTA CATALYST AND METHODS OF MAKING AND USING SAME

(75) Inventor: Wolf Spaether, Ratingen (DE)

(73) Assignee: Novolen Technology Holdings C.V., The Hague (NL)

(*) Notice: Subject to any disclaimer, the term of this patent is extended or adjusted under 35 U.S.C. 154(b) by 26 days.

(21) Appl. No.: 10/223,561

(22) Filed: Aug. 19, 2002

(65) Prior Publication Data
US 2004/0033887 A1 Feb. 19, 2004

(51) Int. Cl.$^7$ ................................. B01J 31/00
(52) U.S. Cl. ................. 502/103; 556/27; 556/51; 556/170; 502/104; 502/115; 502/300; 502/349
(58) Field of Search .......................... 502/103, 104, 502/115, 300, 349, 114, 118, 127, 116; 556/27, 51, 170; 526/348.3

(56) References Cited

U.S. PATENT DOCUMENTS

| | | | |
|---|---|---|---|
| 4,124,532 A | 11/1978 | Giannini et al. | |
| 4,467,044 A | 8/1984 | Band | |
| 4,661,465 A | 4/1987 | Fuentes, Jr. et al. | |
| 4,748,221 A | 5/1988 | Collomb et al. | |
| 4,843,132 A | 6/1989 | Werner et al. | |
| 4,857,613 A | 8/1989 | Zolk et al. | |
| 4,866,144 A | * 9/1989 | Best et al. | 526/129 |
| 4,894,424 A | 1/1990 | Lassalle | |
| 4,921,920 A | 5/1990 | Collomb-Ceccarini et al. | |
| 4,960,741 A | 10/1990 | Bailly et al. | |
| 5,006,620 A | 4/1991 | Zolk et al. | |
| 5,077,358 A | 12/1991 | Durand et al. | |
| 5,098,875 A | 3/1992 | Bailly et al. | |
| 5,106,805 A | 4/1992 | Bailly et al. | |
| 5,162,465 A | 11/1992 | Kerth et al. | |
| 5,192,729 A | 3/1993 | Woo et al. | |
| 5,232,998 A | 8/1993 | Buehler et al. | |
| 5,252,688 A | 10/1993 | Bailly et al. | |
| 5,288,824 A | 2/1994 | Kerth et al. | |
| 5,604,170 A | * 2/1997 | Sano et al. | 502/115 |
| 5,658,840 A | 8/1997 | Kölle et al. | |
| 5,773,535 A | 6/1998 | Friedrich et al. | |
| 5,773,537 A | 6/1998 | Mueller et al. | |
| 5,780,378 A | * 7/1998 | Toida et al. | 502/126 |
| 5,990,251 A | 11/1999 | Gelus | |
| 6,034,023 A | 3/2000 | Kersting et al. | |
| 6,051,523 A | 4/2000 | Kersting et al. | |
| 6,107,231 A | 8/2000 | Hüffer et al. | |
| 6,124,412 A | 9/2000 | Bin-Taleb et al. | |
| 6,156,691 A | 12/2000 | Hüffer et al. | |
| 6,174,969 B1 | 1/2001 | Kersting et al. | |
| 6,200,922 B1 | 3/2001 | Hüffer et al. | |
| 6,207,607 B1 | * 3/2001 | Garoff et al. | 502/127 |
| 6,228,792 B1 | * 5/2001 | Carney | 502/123 |
| 6,521,560 B1 | * 2/2003 | Kojoh et al. | 502/104 |

FOREIGN PATENT DOCUMENTS

| | | |
|---|---|---|
| EP | 0494084 | 7/1992 |
| EP | 0 045 977 B2 | 3/1995 |
| EP | 0773236 | 5/1997 |
| EP | 0776912 | 6/1997 |
| EP | 0859014 | 8/1998 |
| WO | WO 97/23518 | 7/1997 |

OTHER PUBLICATIONS

PCT International Search Report for PCT/US03/25831 filed Aug. 15, 2003.

* cited by examiner

Primary Examiner—Mark L. Bell
Assistant Examiner—Jennine M. Brown
(74) Attorney, Agent, or Firm—Dilworth & Barrese, LLP

(57) ABSTRACT

A method for making a solid catalyst component for use in a Ziegler-Natta catalyst includes combining a porous particulate support with a magnesium source in a hydrocarbon solvent to form a mixture, the magnesium source including a hydrocarbon soluble organomagnesium compound and a hydrocarbon insoluble anhydrous inorganic magnesium-halogen compound. The organomagnesium compound is halogenated and the mixture is reacted with a titanium compound or vanadium compound to form the solid catalyst component. The solid catalyst component is then recovered and combined with an organoaluminum cocatalyst to form a Ziegler-Natta catalyst which is advantageously used for the polymerization of olefins, particularly alk-1-enes such as ethylene, propylene, 1-butene, and the like. The catalyst can optionally include internal and external electron donors.

25 Claims, No Drawings

ZIEGLER-NATTA CATALYST AND METHODS OF MAKING AND USING SAME

BACKGROUND

1. Field of the Invention

The present invention relates to a Ziegler-Natta catalyst, and particularly to a method for making the catalyst and a method for using the catalyst in a polymerization reaction.

2. Background of the Art

Ziegler-Natta catalysts are advantageously used in olefin polymerization reactions to produce stereoregulated linear polymers. Typically, such catalysts include a trialkyl aluminum (e.g., triethyl aluminum) in combination with a transition metal compound such as titanium chloride as co-catalyst. Generally, the Ziegler-Natta catalysts are small, solid particles, but soluble forms and supported catalysts have also been used.

Ziegler-Natta catalysts are especially useful for the homopolymerization and copolymerization ethylene, proplylene, and other alk-1-enes to produce films, fibers and moldings.

U.S. Pat. Nos. 5,162,465 and 5,006,620 disclose the preparation of polymers of propene using a Ziegler-Natta catalyst system consisting of a titanium component which is based on a finely divided, shape-imparting silica gel and contains, in addition to titanium, magnesium, chlorine and a benzenecarboxylic acid derivative, an aluminum component and a silane component. Both patents have in common that the impregnation of the supporting particle is performed using magnesium organic precursor compounds. These compounds are, in general, air and moisture sensitive and require additional solvent addition to the catalyst preparation process. Secondly, the conversion of the magnesium organic precursor compound to the magnesium halide is conducted using halogenating agents like chlorine or hydrogen chloride, which are in general considered as hazardous and environmentally unfriendly compounds.

It would be advantageous to simplify the catalyst preparation and minimize costs and environmental contamination due to waste streams and starting materials.

SUMMARY

A method is provided herein for making a solid catalyst component for use in a Ziegler-Natta catalyst. The method comprising the steps of: (a) combining a porous particulate support with a magnesium source in a hydrocarbon solvent to form a slurry mixture, the magnesium source including a hydrocarbon soluble organomagnesium compound and an inorganic magnesium-halogen compound; (b) halogenating the organomagnesium compound; (c) reacting the slurry mixture with a titanium compound or vanadium compound to form the solid catalyst component; and (d) recovering the solid catalyst component.

The solid catalyst component can be combined with an organoaluminum cocatalyst to provide a Ziegler-Natta catalyst useful for the polymerization of olefins.

The method described herein overcomes the above described disadvantages and provides improved catalytic systems of the Ziegler-Natta type. The resulting catalyst has a high activity and allows the production of polymers of α-alk-1-enes having a good morphology and bulk density.

DETAILED DESCRIPTION OF PREFERRED EMBODIMENTS

The Ziegler-Natta catalyst provided herein includes an aluminum compound, a solid catalytic component used in combination with the aluminum compound as a co-catalyst, and, optionally, an external electron donor. The solid catalytic component includes a transition metal compound such as titanium or vanadium, a magnesium component containing at least one halogen, a porous particulate support, and, optionally, an internal electron donor.

The magnesium content of the solid catalytic component is advantageously provided from a magnesium source which includes both an organomagnesium compound and an uncomplexed solid inorganic magnesium-halogen compound which is preferably anhydrous. Whereas prior known methods of making Ziegler-Natta catalysts, described in U.S. Pat. Nos. 5,162,465 and 5,006,620, employed only an organomagnesium compound as the magnesium source to provide the requisite magnesium content, the method herein employs a reduced amount of organomagnesium compound. Of the total magnesium content of the magnesium source, preferably from about 1 mole percent to about 99 mole percent can be derived from the organomagnesium compound, more preferably from about 10 mole percent to about 90 mole percent, yet more preferably from about 20 mole percent to about 80 mole percent. The balance of the desired magnesium content is provided by the solid magnesium-halogen compound, preferably in a finely divided powder form. Reduction of the amount of organomagnesium compound used to make the catalyst provides several advantages. Organomagnesium compounds require special handling and must be converted to halogenated forms of magnesium by reaction with halogenating agents such as chlorine, hydrogen chloride and the like, which are hazardous materials. Reducing the amount of organomagnesium compound also reduces the concomitant preparation time and costs associated with use of organomagnesium.

According to the invention in the preparation of the catalytic system a particulate porous support is used. The support may be any type of support commonly used in Ziegler-Natta type catalysts which is compatible with the polymerization of alk-1-enes. The support should have the ability to chemically, physically or mechanically bind the halogenated magnesium compound.

A commonly used type of support of Ziegler-Natta catalysts are particulate inorganic metal-oxygen compounds having a specific surface area in the range from about 10 to about 1000 $m^2/g$, preferably of from about 50 to about 700 $m^2/g$, and more preferably from about 100 $m^2/g$ to about 600 $m^2/g$, wherein the specific surface area is determined in accordance with DIN 66131. The catalyst support has a mean particle diameter in the range of from about 5 to about 200 $\mu m$, preferably from about 10 to about 100 $\mu m$, and more preferably from about 10 to about 60 $\mu m$. Mean particle diameter herein refers to the volume average mean (median value) of the particle size distribution as determined by Malvern Mastersizer Analysis (Fraunhofer laser light scattering) in accordance with ASTM Standard D 4464-00.

The particulate inorganic metal-oxygen compounds used in the preparation of the solid catalytic component of the catalytic systems described herein may be of a granular (irregular) or spray-dried (semi-spherical, micro-spheroidal) nature. Also useful is fumed silica, which can be treated in a subsequent wet-chemical treatment to build up larger particle aggregates. Other particulate oxides derived from known particle forming processes can also be used.

Inorganic metal-oxygen compounds useful in the present invention include oxides of silicon, aluminum, titanium, zirconium, metals from Groups I or II of the Periodic Table, or mixtures or chemical combinations of these oxides.

Examples of preferred metal-oxygen compounds include aluminum oxide, silicon oxide, titanium oxide, zirconium oxide, aluminum phosphate, magnesium oxide or layered silicates. Particularly preferred is the use of silicon oxide (silica gel). Also, mixed oxides such as aluminum silicates, or magnesium silicates, may be used.

The particulate inorganic metal-oxygen compounds used as a support in the catalytic component of the invention in general have pore volumes of from about 0.1 $cm^3/g$ to about 10 $cm^3/g$, preferably from about 1.0 $cm^3/g$ to about 4.0 $cm^3/g$, these values being determined by mercury intrusion porosimetry in accordance with DIN 66133 and nitrogen adsorption in accordance with DIN 66131.

The pH value (i.e., the negative logarithm of the protonic concentration) of the particulate inorganic metal-oxygen compounds used in the preparation of the solid catalytic component of the catalytic systems of the invention may vary depending on the production process used. Preferably, the PH value is in the range of from about 3.0 to about 9.0, and more preferably from about 5.0 to about 7.0. The pH value is determined by using the method described in S. R. Morrison, *The Chemical Physics of Surfaces*, Plenum Press, New York [1977], pages 130 ff.

After their production, the inorganic metal-oxygen compounds often contain hydroxyl groups on their surfaces. By cleavage of water or condensation of Si—OH groups respectively, the hydroxyl group content may be reduced or even removed completely. This can be carried out by means of a thermal or chemical treatment. In general, a thermal treatment includes heating the metal-oxygen compound at a temperature of from about 250° C. to about 900° C., preferably from about 600° C. to about 800° C., for a duration of time of from about 1 to about 24 hours, preferably from about 2 to about 20 hours, and more preferably from about 3 to about 12 hours. Removal of the hydroxyl groups by chemical means may be carried out by treating the oxide with usual drying agents such as, for example $SiCl_4$, chlorosilanes and aluminum alkyls. Preferably, the inorganic oxides used contain normally from about 0.1% to about 5% by weight physically adsorbed water in addition to the water bonded in hydroxylic form. Usually the water content is determined by drying the inorganic oxide until constant weight at 160° C. and normal pressure. The loss of weight corresponds with the initial physically adsorbed water content.

In the preparation of the solid catalytic component, the particulate porous catalyst support is impregnated with at least one hydrocarbon soluble organomagnesium compound, as described below. Herein the term "hydrocarbon soluble" means that the organomagnesium compound dissolves in an amount of at least about 5% by weight at ambient temperature in an aliphatic or aromatic hydrocarbon solvent essentially comprising no co-solvents (e.g., ethers, esters, alkanols, and the like).

The organomagnesium compound can be halogen-free, or alternatively can contain a halogen, such as, e.g., Grignard compounds. If a halogen-free organomagnesium compound is used, during the further course of the preparation of the solid catalytic compound the halogen-free organomagnesium compound is converted into a compound of magnesium containing at least one halogen by using known halogenation means (e.g., by contacting with a halogenating agent). Herein, the term "halogen" refers to chlorine, bromine, iodine or fluorine or mixtures of two or more halogens. Preferably, the compound of magnesium containing at least one halogen contains chlorine or bromine, and most preferably, chlorine.

Examples of suitable organomagnesium compounds include dialkyl, diaryl and alkylarylmagnesium compounds, magnesiumalkoxy or magnesiumaryloxy compounds or Grignard compounds.

Examples of suitable halogen-free organomagnesium compounds include di-n-propylmagnesium, di-isopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, and diphenylmagnesium. Among these, n-butylethylmagnesium and n-butyloctylmagnesium are preferred.

Examples of halogen-containing organomagnesium Grignard compounds include n-butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, octylmagnesium chloride, phenylmagnesium chloride, and phenylmagnesium bromide.

Particularly preferred organomagnesium compounds in the preparation of the solid catalytic component are magnesium di($C_2$–$C_{10}$ alkyl) compounds.

The inorganic solid magnesium-halogen compound containing at least one halogen atom can be taken from the group of magnesium halide compounds like magnesium chloride, magnesium bromide and magnesium iodide, as well as mixed halogenoxides or hydroxides like chloromagnesium hydroxide, bromomagnesium hydroxide and iodomagnesium hydroxide and their respective hydrates. Among these compounds the magnesium dihalides corresponding to the formula $MgX_2$ are preferred wherein X is a halogen. Especially preferred is magnesium chloride ($MgCl_2$). Preferably, the inorganic solid magnesium-halogen compound is in a substantially anhydrous condition.

In the preparation of the solid catalytic component of the invention in general from about 0.1 to about 10 moles, preferably from about 0.1 to about 2.0 moles and more preferably from about 0.3 to about 1.5 mole of the sum of organomagnesium and magnesium-halogen compound is used for each mole of the particulate inorganic oxide.

Suitable halogenating agents include halogens in their elemental state, hydrogen halogenides (e.g., HCl, HBr, HI), $SiCl_4$ or $CCl_4$. Especially preferred are chlorine or hydrogen chloride.

The solid catalytic component further comprises a compound of titanium or vanadium.

Titanium compounds useful in preparing the solid catalyst component include the halogenides of tri- or tetravalent titanium. Titanium alkoxy halogenide compounds and mixtures of two or more titanium compounds are also contemplated. Examples of suitable titanium compounds include $TiBr_3$, $TiBr_4$, $TiCl_3$, $TiCl_4$, $Ti(OCH_3)Cl_3$, $Ti(OC_2H_5)Cl_3$, $Ti(O\text{-}iso\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)$ $Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$, or $Ti(O\text{-}n\text{-}C_4H_9)_4$. Preferred titanium compounds include those wherein the halogen is chlorine. Also preferred are those titanium halogenides that in addition to the titanium contain only halogen, and of these the titanium chlorides, and in particular titanium tetrachloride, are preferred.

Vanadium compounds useful in the preparation of the solid catalytic component of the catalytic system described herein include the vanadium halogenides, the vanadium oxyhalogenides, the vanadium alkoxides and vanadium acetylacetonate. Preferred vanadium compounds are those having oxidation stages 3 to 5.

In addition, one or more so-called internal electron donor compounds may be used in the preparation of the solid catalytic component. Examples of suitable internal electron donor compounds include mono or polyfunctional carboxylic acids, carboxylic anhydrides, or carboxylic esters, and also ketones, ethers, alcohols, lactones or organophosphorus or organosilicon compounds.

Preferred internal donor compounds included carboxylic acid derivatives and, in particular, phthalic acid derivatives having the general formula (I):

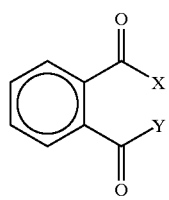
(I)

wherein X and Y each represent a chlorine or bromine atom or a $C_1$–$C_{10}$ alkoxy group, or X and Y taken together represent an oxygen atom forming an anhydride function. Particularly preferred internal electron donor compounds are phthalic esters of formula (I) wherein X and Y each are a $C_1$–$C_8$ alkoxy group, such as a methoxy, ethoxy, n-propyloxy, isopropyloxy, n-butyloxy, sec-butyloxy, or tert-butyloxy group. Examples of preferred phthalic esters include diethyl phthalate, di-n-butyl phthalate, di-isobutyl phthalate, di-n-pentyl phthalate, di-n-hexyl phthalate, di-n-heptyl phthalate, di-n-octyl phthalate or di-2-ethylhexyl phthalate.

Further examples of preferred internal electron donor compounds include diesters of 3- or 4-membered, optionally substituted cycloalkane 1,2-dicarboxylic acids, as well as monoesters of substituted benzophenone 2-carboxylic acids or substituted benzophenone 3-carboxylic acids. As hydroxy compounds in the esterfication reaction for synthesis of these esters, alkanols such as $C_1$–$C_{15}$ or $C_5$–$C_7$ cycloalkanols (optionally substituted with one or more $C_1$–$C_8$ alkyl groups), as well as $C_1$–$C_{10}$ phenols, can be used.

A further group of suitable internal donor compounds are the non-substituted and substituted ($C_1$–$C_{10}$ alkyl)-1,3-propane diethers and derivatives of the group of succinates.

Also, mixtures of two or more internal electron donor compounds may be used in the preparation of the solid catalytic component of the invention.

When used in the preparation of the particulate solid component, the internal electron donor compound in general is used in an amount of from about 0.05 to about 2.0 moles, preferably about 0.2 to about 0.5 mole, for each mole of magnesium in the magnesium source, which includes the sum of the organomagnesium and magnesium halide compound.

In the preparation of the solid catalytic component, the following compounds can preferably be used as doping agents: $C_1$–$C_8$ alkanols, such as methanol, ethanol, n-propanol, isopropyl alcohol, n-butanol, sec-butanol, tert-butanol, isobutyl alcohol, n-hexanol, n-heptanol, n-octanol or 2-ethylhexanol, or mixtures of two or more of these alkanols. A preferred alkanol is ethanol in amounts of about 1 to about 5 moles, preferably about 1.6 to about 4 moles, and more preferably about 1.5 to about 3.5 moles, for each mole of the sum of the organomagnesium and magnesium-halogen compound used.

In addition to the solid catalytic component, the Ziegler-Natta catalytic system of the invention further includes an aluminum compound as co-catalyst.

Examples of suitable aluminum compounds include aluminum trialkyls and derivatives thereof wherein an alkyl group is substituted by an alkoxy group or a halogen atom, e.g. chlorine or bromine atom. The alkyl groups may be the same or different. The alkyl groups may be linear or branched chain alkyl groups. Preferred trialkylaluminum compounds are those wherein the alkyl groups each have 1 to 8 C-atoms, such as trimethylaluminum, triethylaluminum, triisobutylaluminum, trioctylaluminum or methyldiethyl aluminum.

In addition to the aluminum compound the catalytic system of the invention preferably includes as further co-catalyst an external electron donor compound. Examples of external electron donor compounds which may be used in the catalytic system of the invention include mono- and polyfunctional carboxylic acids, carboxylic anhydrides and carboxylic esters, and ketones, ethers, alcohols, lactones as well as organic phosphorus and silicon compounds. Also, a mixture of two or more external electron donor compounds can be used. The external electron donor compound and the internal electron donor compound used in the preparation of the solid catalyst component may be the same or different. Preferred external electron donor compounds are the organosilicon compounds of general formula (II):

$$R^1{}_n Si(OR^2)_{4-n} \qquad (II)$$

wherein each $R^1$ may, be the same or different and represents a $C_1$–$C_{20}$ alkyl group, a 5- to 7-membered cyclic alkyl group optionally substituted with $C_1$–$C_{10}$ alkyl, a $C_6$–$C_{18}$ aryl group or a $C_6$–$C_{18}$ aryl-$C_1$–$C_{10}$ alkyl group, and each $R^2$ may be the same or different and represents a $C_1$–$C_{20}$ alkyl group, and n is an integer equal to 1, 2 or 3.

Preferred compounds of formula (II) are diisopropyldimethoxysilane, isobutylisopropyldimethoxysilane, diisobutyldimethoxysilane, dicyclopentyldimethoxysilane, cyclohexylmethyldimethoxysilane, dicyclohexyldimethoxysilane, isopropyl-tert-butyldimethoxysilane, isopropyl-sec-butyldimethoxysilane, and isobutyl-sec-butyldimethoxysilane.

The solid inorganic catalytic component of the invention preferably is produced by using the following process:

In a first stage the particulate porous support, e.g., an inorganic oxide, is suspended in an inert solvent, preferably a liquid alkane or aromatic hydrocarbon solvent, (e.g., toluene or ethylbenzene) and the slurry formed is treated with a solution of the hydrocarbon soluble organomagnesium compound (i.e., in a hydrocarbon solvent such as heptane), and then the mixture formed is reacted at a temperature of from about 10° C. to about 120° C. for from about 0.5 to about 5 hours, normally under stirring.

Next, a halogenating agent, preferably chlorine or hydrogen chloride, is added in at least a two-fold molar excess, preferably at least a five-fold molar excess, based on the organomagnesium compound, in general under stirring, and allowed to be reacted for about 30 to about 120 minutes. The anhydrous inorganic magnesium-halogen compound such as described above is added without any additional solvent. The anhydrous inorganic magnesium-halogen compound is preferably a finely divided powder, insoluble in the hydrocarbon, which is suspended in the hydrocarbon solvent as a component of the slurry. Optionally, an anhydrous solid magnesium halide (e.g., magnesium chloride, $MgCl_2$) is added either together with the particulate solid support prior to the treatment with the organomagnesium compound, or after the addition of the organomagnesium compound prior to the halogenating step.

Optionally, about 1 to 5 moles, preferably about 1.6 to 4 moles, more preferably about 1.5 to 3.5 moles of the $C_1$–$C_8$ alkanol are then added for each mole of the combined magnesium compounds at a temperature between about −20° C. and 150° C., and preferably reacted for a period of 60 min.

Next, a compound of titanium or vanadium, preferably a titanium compound, and optionally the internal electron donor compound, are added in an amount of 1 to 15 moles, preferably 2 to 10 moles of the titanium compound, and 0.01 to 1 mole, preferably 0.2 to 0.5 mole of the internal electron donor compound, for each mole of the combined magnesium compounds. The resulting mixture is allowed to react, generally under stirring, for at least about 30 minutes at a temperature in the range of from about 10° C. to 150° C., preferably from about 60° C. to 130° C. The resulting solid product is then recovered by filtration and washed with a $C_1$–$C_{10}$ alkylbenzene, preferably ethylbenzene.

In a following stage the resulting solid product is extracted with an excess of titanium tetrachloride or an excess of a solution of titanium tetrachloride in an inert solvent, preferably a $C_7$–$C_{10}$ alkylbenzene, containing at least about 5% by weight of titanium tetrachloride. In general, the extraction is continued for at least about 30 minutes. Then the product is washed with a liquid alkane until the content of titanium tetrachloride in the washing liquid is less than 2% by weight.

The solid catalytic component preferably has a molar ratio of the inorganic oxide to the compound of titanium or vanadium in the range of from about 1000 to 1, more preferably from about 100 to 2, and most preferably from about 50 to 3.

In an alternative embodiment of the method, the porous particulate support is treated with a solution of a hydrocarbon soluble organomagnesium compound in a hydrocarbon solvent. Two equivalents of alkanol (preferably ethanol) based on the total amount of magnesium are added. Solid magnesium chloride ($MgCl_2$) is then added to the slurry mixture. The mixture is then treated with $TiCl_4$ to chlorinate the organomagnesium compound and then treated with an internal electron donor such as described above (e.g., dibutyl phthalate). The solids are then separated by, e.g., filtration or other suitable method, and extracted with $TiCl_4$ or $TiCl_4$ in an aromatic solvent.

An advantage of the solid catalytic component of the invention is that at least some of the cost intensive and air/moisture sensitive organomagnesium compound can be substituted by a commonly available, cost efficient and easy to handle solid inorganic magnesium-halogen compound. Since the solid inorganic magnesium-halogen compound can be added to the process without using any solvents the amount of waste solvents produced in the catalyst preparation step is significantly reduced and therefore filtration times are reduced.

To prepare the catalytic system of the invention the aluminum compound as co-catalyst and the external electron donor compound as additional co-catalyst may be contacted with the solid catalytic component separately in any order or mixed together, normally at a temperature in the range of from about 0° C. to about 200° C., preferably from about 20° C. to about 90° C. and a pressure of from 1 to 100 bar, preferably from about 1 to about 40 bar.

Preferably, the aluminum compound co-catalyst is added in such an amount that the atomic ratio of the aluminum compound to the transition metal of the solid catalytic component is from about 10:1 to about 800:1, more preferably from about 20:1 to about 200:1.

The catalytic systems of the invention may be advantageously used in the polymerization of alk-1-enes. Suitable alk-1-enes include linear or branches $C_2$–$C_{10}$ alkenes, in particular linear $C_2$–$C_{10}$ alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalytic systems of the invention comprising the solid catalytic components and as co-catalyst an aluminum compound or an aluminum compound and an external electron donor compound are excellent catalytic systems for use in the production of propylene polymers, both homopolymers of propylene as well as copolymers of propylene and one or more further alk-1-enes having up to 10 carbon atoms.

The term copolymers as used herein also refers to copolymers wherein the further alk-1-ene having up to 10 carbon atoms is incorporated randomly. In these copolymers the comonomer content is generally less than about 15% by weight. The copolymers may also be in the form of so-called block or impact copolymers, which comprise at least a matrix of a propylene homopolymer or propylene random copolymer containing less than 15% by weight of a further alk-1-ene having up to 10 carbon atoms and a soft phase of a propylene copolymer containing about 15% to about 80% by weight of further alk-1-enes having up to 10 C-atoms. Also mixtures of comonomers are contemplated, resulting in, e.g., terpolymers of propylene.

The production of the propylene polymers may be carried out in any common reactor suitable for the polymerization of alk-1-enes, either batchwise or, preferably, continuously, i.e., in solution (bulk phase), as suspension polymerization or as gas phase polymerization. Examples of suitable reactors include continuously operated stirred reactors, loop reactors, fluid bed reactors, or horizontal or vertical stirred powder bed reactors. It will be understood that the polymerization may be carried out in a series of consecutively coupled reactors. The reaction time depends on the chosen reaction conditions. In general the reaction time is from about 0.2 hours to about 20 hours, usually from about 0.5 hours to 10 hours.

In general the polymerization is carried out at a temperature in the range of from about 20° C. to about 150° C., preferably from about 50° C. to about 120° C., and more preferably from about 60° C. to about 90° C., and a pressure in the range of from about 1 bar to about 100 bar, preferably from about 15 bar to about 40 bar, and more preferably from about 20 bar to 35 bar.

The molecular weight of the so produced polymers may be controlled and adjusted over a wide range by adding polymer chain transfer or termination inducing agents as commonly used in the art of polymerization, such as hydrogen. In addition an inert solvent, such as toluene or hexane, or an inert gas, such as nitrogen or argon, and smaller amounts of a powdered polymer, e.g., polypropylene powder may be added.

The (weight) average molecular weights of the propylene polymers produced by using the catalytic system of the invention in general are in the range of from about 10,000 g/mole to 1,000,000 g/mole and the melt flow rates are in the range of from about 0.1 to about 100 g/10 min, preferably from about 0.5 to about 50 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included.

The catalytic systems of the invention enable the polymerization of alk-1-enes to produce polymers having a good morphology and a high bulk density when compared with the prior art catalytic systems. In addition, the catalytic systems of the invention have an increased productivity.

Due to their good mechanical properties the polymers obtainable by using the solid catalytic component of the present invention, and in particular the propylene homopolymers or the copolymers of propylene with one or more further alk-1-enes having up to 10 carbon atoms, can be used advantageously for the production of fibers or moldings, and especially for the production of films.

Examples illustrating the invention, as well as Comparative Examples (not in accordance with the invention) are provided below. A Polymerization Example illustrates the use of the catalyst in a polymerization process. The solid catalytic components, catalytic systems and polymers obtained in the Examples and Comparative Examples below were characterized by carrying out the following tests.

To determine the mean particle diameter D of the particulate inorganic oxide the particle size distribution of the particles of the oxide was measured by laser light scattering (Malvern) analysis in accordance with ASTM Standard D 4464-00 and from the result the volume average (median value) particle diameter was calculated.

To determine the particle size distribution of the resulting polymer samples, the untreated autoclave polypropylene powder was measured by laser light scattering (Malvern) analysis in accordance with ASTM Standard D 4464-00 and from the result the volume average (median value) particle diameter was calculated.

The specific surface area was measured by nitrogen adsorption in accordance with DIN 66131.

The pore volume was measured by mercury porosimetry in accordance with DIN 66133.

The pH value of the silica gel was measured by using the method described in S. R. Morrison, *The Chemical Physics of Surfaces*, Plenum Press, New York [1977], pages 130 ff.

To determine the physically adsorbed water content 5.0 g silica gel was dried at 160° C. and normal pressure (constant weight). The resulting loss of weight corresponds to the initial physically bonded water content.

The productivity is defined as the amount of polymer in grams obtained per gram solid catalytic component used.

The melt flow rate "MFR" was measured in accordance with ISO-Norm 1133, at 230° C. and a load of 2.16 kg.

The isotacticity index was measured in accordance with ISO Norm 1873-1:1999.

EXAMPLE 1

A spray dried silica gel ($SiO_2$) having a mean particle diameter D of 60 $\mu$m was used as the particulate porous support. The silica gel was further characterized by a specific surface area of 500 m$^2$/g, a pore volume of 1.6 cm$^3$/g, a pH-value of 6.5, and a water content of 2.1% by weight.

The silica gel was treated with a solution of n-butylethylmagnesium in a mixture of n-heptane and ethylbenzene (heptane content 33%), using 0.25 mole of the organomagnesium magnesium compound for each mole of $SiO_2$. The solution was stirred at a temperature of 95° C. for 30 minutes and then cooled to 20° C., and then a 5-fold excess, based on the organomagnesium compound, of hydrogen chloride was introduced. After 60 minutes to the reaction product was added 0.25 mole of dry, anhydrous magnesium chloride per mole of solid support. The total ratio of magnesium to silica was 0.50 moles Mg per mole $SiO_2$, of which 50 mole percent of the magnesium in the solid catalyst component was derived from the anhydrous magnesium chloride. Half of the organomagnesium compound was substituted for by anhydrous magnesium chloride on a mole basis. The mixture was treated with 2.5 mole ethanol per mole of combined magnesium compounds and was stirred at 80° C. for 60 min. The solid reaction product was treated with 6.0 mole titanium tetrachloride and 0.41 mole di-n-butyl phthalate per mole of combined magnesium compounds used. Then stirring was continued for 1 hour at 100° C. and the solids formed were filtered out and washed several times with ethylbenzene. The obtained solid product was extracted with a 10% (vol %) solution of titanium tetrachloride in ethylbenzene. Then the solid product was separated from the extraction agent and washed with n-heptane until the washing effluent contained only 0.3% by weight of titanium tetrachloride.

The resulting solid catalytic component contained 4.2% by weight Ti, 7.4% by weight Mg, and 33.6% by weight Cl.

COMPARATIVE EXAMPLE A

In this Comparative Example the procedure of Example 1 was repeated except that there was no solid magnesium halide added to the reaction mixture in addition to the organomagnesium compound which was reacted with the silica gel. That is, 0.50 moles of the n-butylethyl magnesium compound were used for each mole of $SiO_2$. The molar ratio of total magnesium to the silica support was the same as in Example 1.

The resulting solid catalytic component contained 4.2% by weight Ti, 8.7% by weight Mg, and 34.5% by weight Cl.

EXAMPLE 2

The procedure of Example 1 was repeated, except that 90 mole percent of the organomagnesium compound was replaced by solid magnesium chloride powder. The total magnesium was used in an amount of 0.5 mole per mole $SiO_2$, of which 0.45 moles were derived from the anhydrous magnesium chloride and 0.05 moles were derived from n-butylethyl magnesium.

The resulting solid catalytic component contained 4.2% by weight Ti, 8.4% by weight Mg, and 34.5% by weight Cl.

COMPARATIVE EXAMPLE B

In this Comparative Example the procedure of Example 2 was repeated except that there was no organomagnesium compound added to the reaction mixture. The molar ratio of the solid magnesium chloride to the $SiO_2$ was 0.5 moles $MgCl_2$ per mole of $SiO_2$.

The resulting solid catalytic component contained 4.2% by weight Ti, 7.1% by weight Mg, and 34.5% by weight Cl.

EXAMPLE 3

The procedure of Example 1 was repeated, except that a microspheroidal spray-dried silica gel having a mean diameter of the spray dried particles of 20 $\mu$m, a BET surface area of 490 m$^2$/g, and a pore volume of 1.65 ml/g was used. The total amount of magnesium compounds was used in a ratio of 0.5 mole per mole $SiO_2$.

The resulting solid catalytic component contained 4.2% by weight Ti, 9.9% by weight Mg, and 34.5% by weight Cl.

COMPARATIVE EXAMPLE C

In this Comparative Example the procedure of Example 3 was repeated except that there was no solid magnesium halide added to the reaction mixture additionally to the organomagnesium compound which was reacted with the silica gel. The molar ratio of silica support and total magnesium was the same as in Example 1.

The resulting solid catalytic component contained 4.2% by weight Ti, 9.2% by weight Mg, and 34.5% by weight Cl.

COMPARATIVE EXAMPLE D

In this comparative Example no silica support was used. Instead, magnesium chloride was treated with 2.5 molar equivalents of ethanol according to Example 1. The reaction produced an undefined solid resulting from the agglomerations of solids in the reaction mixture. The product solid could not be subjected to extraction or activation.

POLYMERIZATION EXAMPLE

The solid catalytic components of Examples 1–3 as well as those of the Comparative Examples A–C were individually examined under the same conditions in polymerizations carried out as described below:

A 5 liter pressure autoclave was charged with 10 mmoles of triethylaluminum, 0.5 mmoles of cyclohexylmethyl dimethoxysilane (each dissolved in 10 ml heptane) and 915 g of liquid propylene at ambient temperature under stirring. Subsequently, the catalyst (25 mg in 10 ml of heptane) was flushed into the reactor with another portion of 915 g of liquid propylene. The reactor is heated to 70° C. within 10 min after which the propylene was reacted under polymerization conditions for another 60 minutes. The reaction was terminated by means of releasing the pressure and cooling down the reactor. The polypropylene homopolymer was recovered and the catalytic productivity (g polymer/g solid catalytic component) was determined gravimetrically. The melt flow rate and the isotacticity index, based on the xylene solubles, of the polymer in unaltered form were determined.

The properties of the propylene homopolymers obtained by using the polymerization procedure described above and using the solid catalytic components prepared in the Examples and the Comparative Examples are presented in the following Table I.

TABLE I

|  | Examples | | | Comparative Examples | | |
| --- | --- | --- | --- | --- | --- | --- |
|  | 1 | 2 | 3 | A | B | C |
| Mean particle diameter (D) SiO$_2$ [μm] | 60 | 60 | 20 | 60 | 60 | 20 |
| Ratio Mg/SiO$_2$ [mole/mole] (max.) | 0.5 | 0.5 | 0.5 | 0.5 | 0.5 | 0.5 |
| Spec. surface area (BET) [m$^2$/g] | 500 | 500 | 495 | 500 | 500 | 495 |
| Preparation time | 90% | 80% | 90% | 100% | 70% | 100% |
| Amount of gaseous HCl | 50% | 10% | 50% | 100% | 0% | 100% |
| Amounts of waste solvents | 80% | 60% | 80% | 100% | 55% | 100% |

TABLE I-continued

|  | Examples | | | Comparative Examples | | |
| --- | --- | --- | --- | --- | --- | --- |
|  | 1 | 2 | 3 | A | B | C |
| Productivity [g PP/g solid cat. Component] | 28,000 | 28,000 | 30,000 | 28,000 | 25,000 | 30,000 |
| MFR [g/10 min] | 7.2 | 11 | 11 | 8.2 | 11.3 | 10 |
| Xylene solubles [%] | 0.5 | 0.7 | 1.2 | 0.8 | 1.2 | 0.8 |
| Isotacticity index II | 99.5 | 99.3 | 98.8 | 99.2 | 98.8 | 99.2 |

The particle size distribution (as determined by Malvern analysis) of the polymers obtained by using the catalyst components of Examples 1 and 2, and Comparative Examples A and B are set forth below in Table II.

TABLE II (Particle sizes, microns)

| Size Fraction (percentile) | Example 1 | Comparative Example A | Example 2 | Comparative Example B |
| --- | --- | --- | --- | --- |
| D 10 | 1,100 | 1,100 | 900 | 1,050 |
| D 50 | 1,700 | 1,700 | 1,550 | 1,650 |
| D 90 | 2,400 | 2,350 | 2,400 | 2,400 |

Ziegler-Natta catalysts are the subject of continued improvements, because their properties such as activity/productivity, morphology, stereospecificity very strongly effect the polymerization process.

Besides the performance it is always of strong commercial and environmental interest to reduce the costs and amounts of waste streams, respectively.

This can be accomplished by replacing a part of the expensive and hazardous organomagnesium precursor compound by easy to handle and cost efficient magnesium halides. The morphology and performance of the respective catalysts are comparable to the catalyst which employ organomagnesium precursor compounds only. Overall, the improved preparation saves a considerable amount of costs as well as batch cycle time and solvents.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. A method for making a solid catalyst component for use in a Ziegler-Natta catalyst, the method comprising the steps of:

a) combining a porous particulate support with a magnesium source in a hydrocarbon solvent to form a slurry mixture, the magnesium source including a hydrocarbon soluble organomagnesium compound and hydrocarbon insoluble inorganic magnesium-halogen compound;

b) halogenating the organomagnesium compound; and, c) reacting the slurry mixture with a titanium compound or vanadium compound to form the solid catalyst component wherein the ratio of total moles of magnesium in the magnesium source to the moles of the porous particulate support ranges from about 0.1:1 to about 10:1.

2. The method of claim 1 further including the step of recovering the solid catalyst component.

3. The method of claim 2 wherein the step of recovering the solid catalyst component comprises filtering out the solid catalyst component end washing the solid catalyst component with an alkylbenzene.

4. The method of claim 1 wherein the ratio of total moles of magnesium in the magnesium source to the moles of the porous particulate support ranges from about 0.1:1 to about 2.0:1.

5. The method of claim 1 wherein the ratio of total moles of magnesium in the magnesium source to the moles of the porous particulate support ranges from about 0.3:1 to about 1.5:1.

6. The method of claim 1 wherein the porous particulate support comprises an inorganic metal-oxygen compound selected from the group consisting of aluminum oxide, silicon oxide, titanium oxide, zirconium oxide, aluminum phosphate, magnesium oxide, aluminum silicate and magnesium silicate.

7. The method of claim 6 wherein the porous particulate support has a specific surface area ranging from about 10 $m^2/g$ to about 1000 $m^2/g$, a mean particle diameter of from about 5 $\mu m$ to about 200 $\mu m$, and a pore volume of from about 0.1 $cm^3/g$ to about 10 $cm^3/g$.

8. The method of claim 6 wherein the porous particulate support has a specific surface area ranging from about 100 $m^2/g$ to about 600 $m^2/g$, a mean particle diameter of from about 10 $\mu m$ to about 60 $\mu m$, and a pore volume of from about 1.0 $cm^3/g$ to about 4.0 $cm^3/g$.

9. The method of claim 1 wherein the hydrocarbon fluid comprises a liquid alkane or an aromatic hydrocarbon.

10. The method of claim 9 wherein the aromatic hydrocarbon is toluene or ethylbenzene.

11. The method of claim 1 wherein the hydrocarbon soluble organomagnesium compound is selected from the group consisting of dialkylmagnesium compounds, diarylmagnesium compounds, alkylarylmagnesium compounds, magnesium alkoxy compounds, magnesiumaryloxy compounds and Grignard compounds.

12. The method of claim 11 wherein the Grignard compound is selected from the group consisting of n-butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesiurn chloride, octylmagnesium chloride, phenylmagnesium chloride, and phenylmagnesium bromide.

13. The method of claim 1 wherein the organomagnesium compound is selected from the group consisting of di-n-propylmagnesium, di-isopropylmagnesium, di-n-butylmagnesium, di-sec-butylmagnesium, di-tert-butylmagnesium, diamylmagnesium, n-butylethylmagnesium, n-butyl-sec-butylmagnesium and n-butyloctylmagnesium, diphenylmagnesium.

14. The method of claim 1 wherein the inorganic magnesium-halogen compound is selected form the group consisting of magnesium chloride, magnesium bromide, magnesium iodide, chloromagnesium hydroxide, bromomagnesium hydroxide, iodomagnesium hydroxide, and hydrates thereof.

15. The method of claim 1 wherein the titanium compound is selected from the group consisting of $TiBr_3$, $TiBr_4$, $TiCl_3$, $TiCl_4$, $Ti(OCH_3)Cl_3$, $Ti(OC_2H_5)Cl_3$, $Ti(O\text{-iso-}C_3H_7)Cl_3$, $Ti(O\text{-n-}C_4H_9)Cl_3$, $Ti(OC_2H_5)Br_3$, $Ti(O\text{-n-}C_4H_9)Br_3$, $Ti(OCH_3)Cl_2$, $Ti(OC_2H_5)Cl_2$, $Ti(O\text{-n-}C_4H_9)_2Cl_2$, $Ti(OC_2H_5)_2Br_2$, $Ti(OCH_3)_3Cl$, $Ti(OC_2H_5)_3Cl$, $Ti(O\text{-n-}C_4H_9)_3Cl$, $Ti(OC_2H_5)_3Br$, $Ti(OCH_3)_4$, $Ti(OC_2H_5)_4$ and $Ti(O\text{-n-}C_4H_9)_4$.

16. The method of claim 1 wherein the anhydrous inorganic magnesium-halogen compound is magnesium chloride and the titanium compound is $TiCl_4$.

17. The method of claim 1 wherein the vanadium compound includes vanadium having oxidation stages 3 to 5, the vanadium compound being selected from the group consisting of vanadium halogenides, vanadium oxyhalogenides, vanadium alkoxides and vanadium acetylacetonate.

18. The method of claim 1 wherein the step of halogenating the organomagnesium compound comprises contacting the organomagnesium compound with a chlorinating agent selected from the group consisting of chlorine and hydrogen chloride.

19. The method of claim 1 further comprising contacting the solid catalyst component with an internal electron donor.

20. The method of claim 19 wherein the internal electron donor is a compound selected from the group consisting of monofunctional carboxylic acids, polyfunctional carboxylic acids, carboxylic anhydrides, carboxylic esters, ketones, ethers, alcohols, lactones, organophosphorus compounds, organosilicon compounds and combinations thereof.

21. The method of claim 19 wherein the internal electron donor is a compound selected from the group consisting of diethyl phthalate, di-n-butyl phthalate, di-isobutyl phthalate, di-n-pentyl phthalate, di-n-hexyl phthalate, di-n-heptyl phthalate, di-n-octyl phthalate and di-2-ethylhexyl phthalate.

22. A method for making a solid catalyst component for use in a Ziegler-Natta catalyst, the method comprising the steps of:

a) combining a porous particulate support with a magnesium source in a hydrocarbon solvent to form a slurry mixture, the magnesium source including a hydrocarbon soluble organomagnesium compound and a hydrocarbon insoluble inorganic magnesium-halogen compound;

b) halocgenating the organomagnesium compound; and, c) reacting the slurry mixture with a titanium compound or vanadium compound to form the solid catalyst component wherein the mole ratio of organomagnesium compound to inorganic magnesium-halogen compound ranges from about 1:99 to about 99:1.

23. The method of claim 22 wherein the mole ratio of organomagnesium compound to inorganic magnesium-halogen compound ranges from about 10:90 to about 90:10.

24. The method of claim 22 wherein the mole ratio of organomagnesium compound to inorganic magnesium-halogen compound ranges from about 20:80 to about 80:20.

25. A method for making a solid catalyst component for use in a Ziegler-Natta catalyst, the method comprising the steps of:

a) combining a porous particulate support with a magnesium source in a hydrocarbon solvent to form a slurry mixture, the magnesium source including a hydrocarbon soluble organomamagnesium compound and a hydrocarbon insoluble inorganic magnesium-halogen compound;

b) halogenatiing the organomagnesium compound; and, c) reacting the slurry mixture with a titanium compound or vanadium compound to form the solid catalyst component further including the steps of recovering the solid catalyst component and extracting the solid catalyst component with a solution of titanium tetrachloride in an inert solvent.

* * * * *